Oct. 18, 1966  HANS-JOACHIM CONRAD  3,279,392
SEALING ARRANGEMENT FOR USE IN CONNECTION WITH
ROTARY DISPLACEMENT MEANS, ESPECIALLY
FOR HYDROSTATIC CONVERTERS
Filed March 4, 1965  6 Sheets-Sheet 2

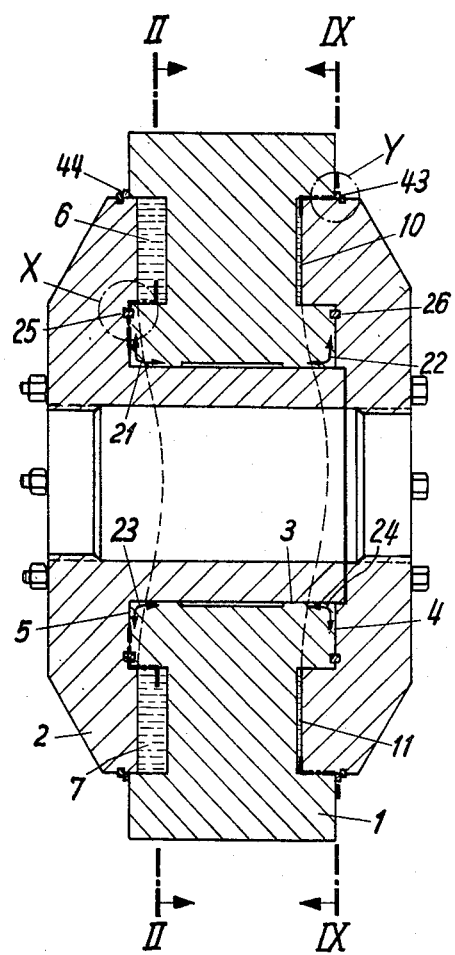
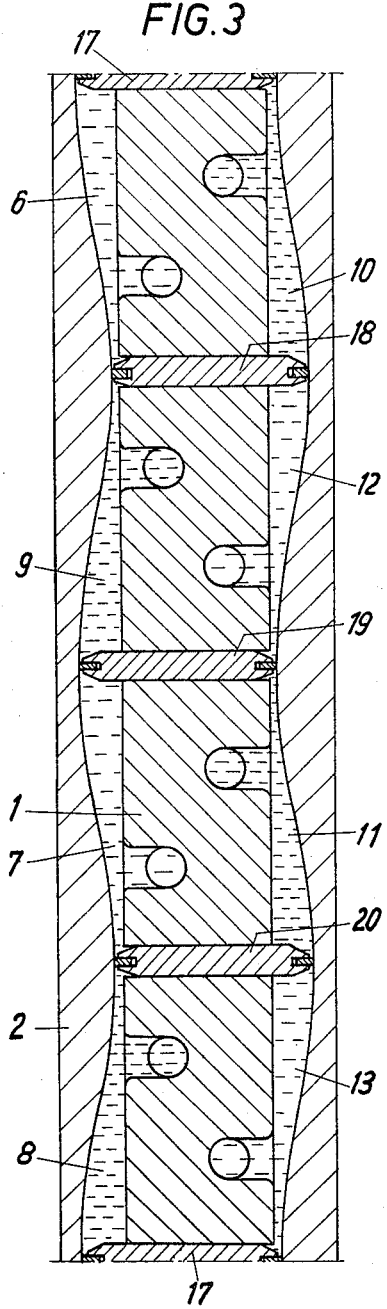

Inventor:
Hans-Joachim Conrad

Oct. 18, 1966    HANS-JOACHIM CONRAD    3,279,392
SEALING ARRANGEMENT FOR USE IN CONNECTION WITH
ROTARY DISPLACEMENT MEANS, ESPECIALLY
FOR HYDROSTATIC CONVERTERS
Filed March 4, 1965    6 Sheets-Sheet 3
FIG. 6
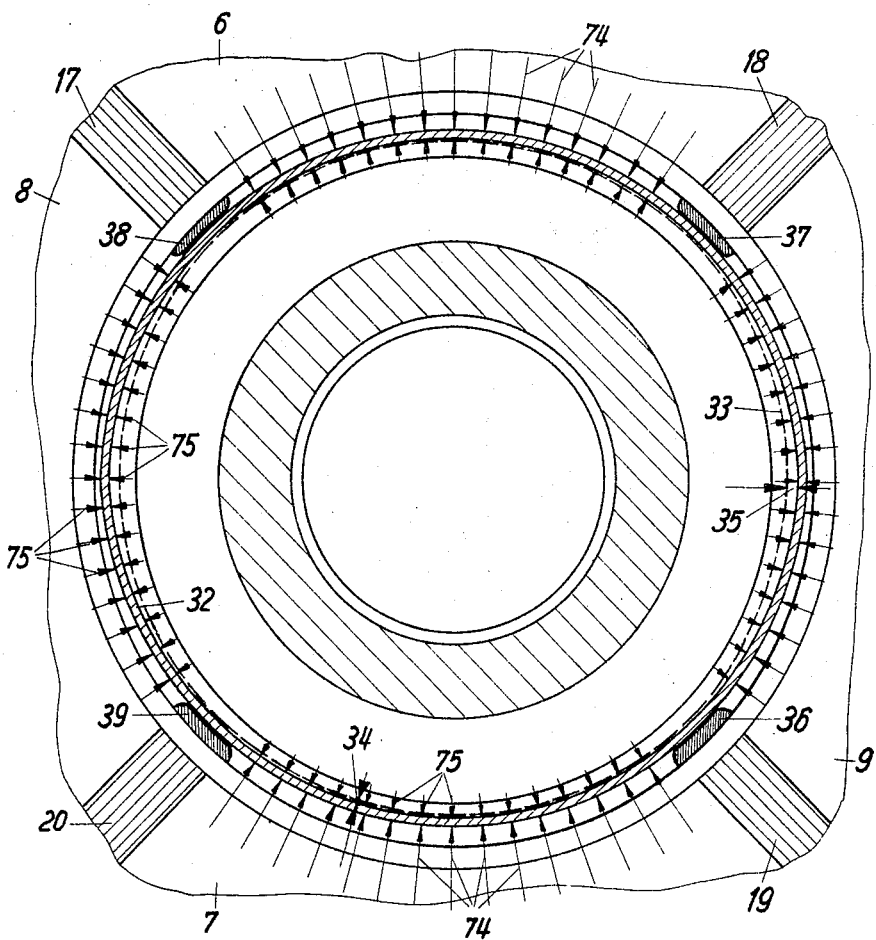
FIG. 7  FIG. 7a  FIG. 7c
        FIG. 7b
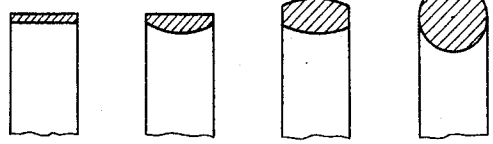
Inventor:
Hans-Joachim Conrad
By Inventor:
Hans-Joachim Conrad
By

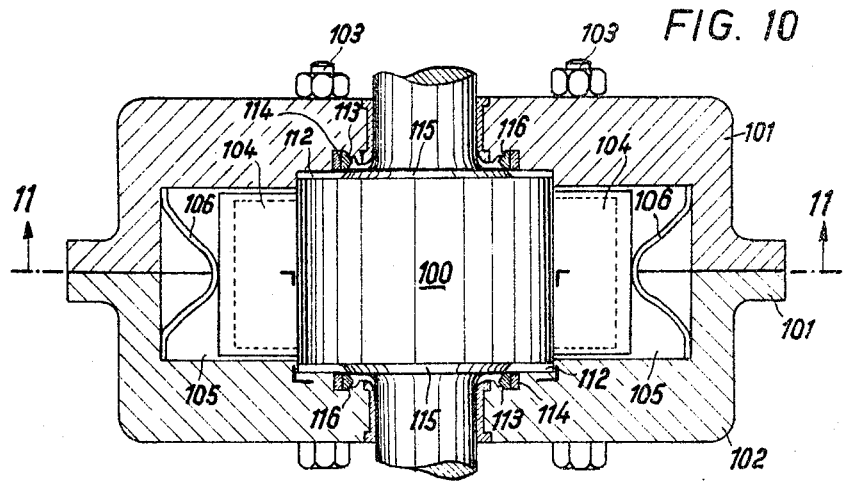
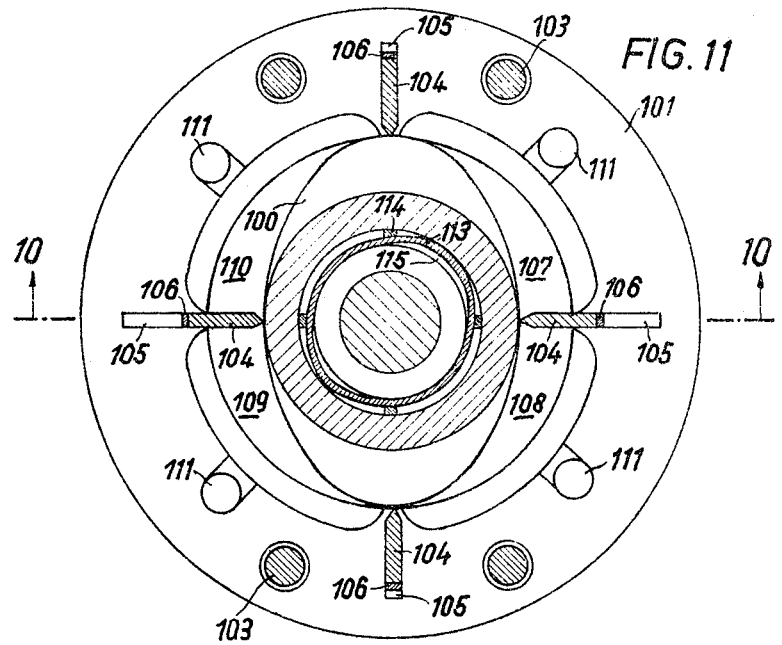

3,279,392
SEALING ARRANGEMENT FOR USE IN CONNECTION WITH ROTARY DISPLACEMENT MEANS, ESPECIALLY FOR HYDROSTATIC CONVERTERS
Hans-Joachim Conrad, Essen-Bredeney, Germany, assignor to Beteiligungs-und Patentverwaltungsgesellschaft mit beschrankter Haftung, Essen, Germany
Filed Mar. 4, 1965, Ser. No. 437,177
Claims priority, application Germany, Mar. 6, 1964, B 75,767
7 Claims. (Cl. 103—202)

The present invention relates to a sealing arrangement in hydrostatic converters and, more specifically, concerns the sealing of a rotatable displacement member relative to the housing therefor in a rotary displacement arrangement for converting a reciprocatory movement into a rotary movement. Such arrangements for converting a reciprocatory movement into a rotary movement are known and described for instance in my Patents Nos. 3,066,476 and 3,163,090 and comprise primarily reciprocable displacement elements and a rotary displacement member connected to said elements through the intervention of a hydraulic linkage system. Such hydrostatic converters are preferably employed in internal combustion engines in lieu of a crank drive for conveying power to an output shaft. In such hydrostatic converters, an intermediate chamber between the housing and the rotary displacement member is sub-divided into pressure chambers by sealing elements uniformly distributed over the circumference, and the volumes of said pressure chambers change in cycles during the rotation of said displacement member. The fluid conveyed to the reciprocable displacement elements is split up into at least two flows which each communicate with a pressure chamber in such a way that the forces exerted by the fluid upon the rotary displacement member will balance each other in radial direction.

With such hydrostatic rotary converters of the above mentioned type, it is necessary that the pressure chambers arranged at the circumference or laterally of the rotary displacement member are sealed relative to each other inasmuch as in said pressure chambers a different pressure prevails and, consequently, pressure fluid would otherwise pass from a chamber of a higher pressure to a chamber of a lower pressure thereby affecting the degree of efficiency of the hydrostatic converter. In this connection, it is also necessary that the seal be effected by as simple means as possible. It is, however, not necessary that an absolute seal prevails because the technical means to produce such absolute seal would incur expenses which are by no means justified by the rather minor leakage losses and the slight decrease in efficiency caused by such leakage losses.

It is an object of the present invention to provide a sealing arrangement for sealing a rotary displacement member in a hydrostatic converter relative to the housing surrounding said rotary displacement member in such a way that the required seal can be effected with simple means which are safe and reliable in operation.

It is another object of this invention to provide a sealing arrangement as set forth above which will not be affected at all or only to a negligible extent by an increase in the diameter due to heat expansion.

It is also an object of this invention to provide a sealing arrangement as outlined in the preceding paragraphs, in which the stationary housing and the rotary displacement member may radially and/or axially change their location with regard to each other without affecting the seal.

These and other objects and advantages of the invention will appear more clearly from the following specification in connection with the accompanying drawings, in which:

FIG. 1 represents an axial section through the rotary displacement member which by means of a hydraulic linkage is connected with two reciprocable displacement elements pertaining to the piston of an internal combustion engine.

FIG. 3 is a development of the rotary piston and its housing.

FIG. 6 shows a section similar to the central portion of FIG. 2 but on a larger scale than the latter.

FIGS. 7–7c illustrate a plurality of possible cross sections of a ring pertaining to the sealing arrangement according to the present invention.

FIGS. 10 and 11 show another embodiment of a rotary displacement member. FIG. 10 is the section along the line X—X in FIG. 11, FIG. 11 is the section along the line XI—XI in FIG. 10.

Figure 2:
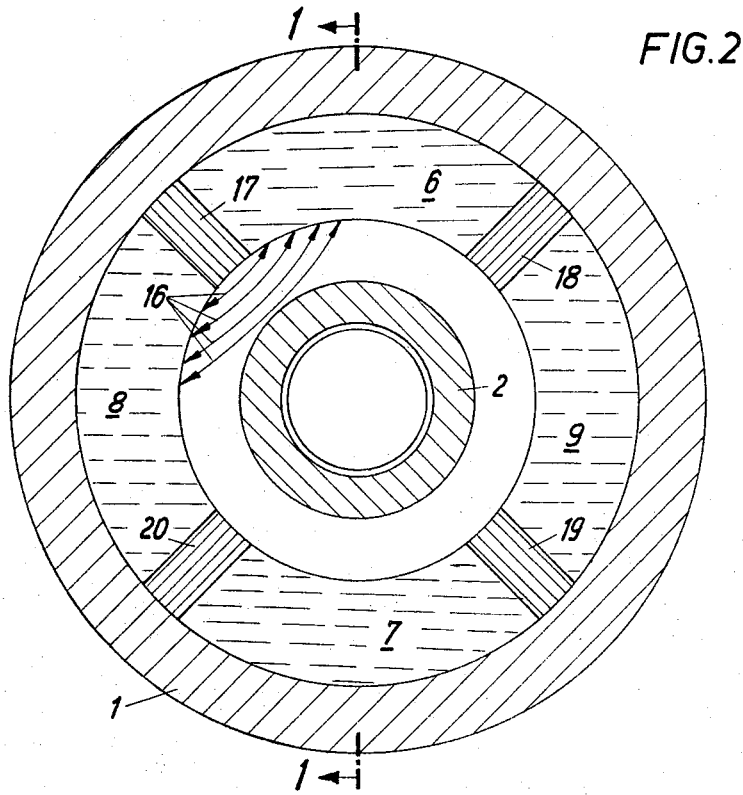
FIG. 2 represents a section along the line II—II of FIG. 1.

For purposes of sealing circular gaps, heretofore slide ring seals have been employed in numerous designs. Such slide ring seals, however, are either not at all or only under certain conditions applicable for the problem underlying the present invention because in the annular gaps involved in hydrostatic converters of the type outlined above, the pressure over the entire circumference of the gap varies. Moreover, there is to be considered a cyclic pressure change in conformity with the cycles of the pistons, which working cycles are not in phase with each other. The pressure differences along the circumference of the sliding rings result in a deformation of the latter in radial direction. In addition to the above mentioned deformation of the elements of the slide ring seal itself, there is also to be considered the deformation of the elements to which the two rings of such seal which slide upon each other are connected namely, the housing and the rotary piston or displacement member, said last mentioned deformation being due to the influence of the pressures changing as to time and location.

Furthermore, with large slide ring seals which are primarily involved, i.e., with slide ring seals having a diameter of 1 yard and more, the heat expansion greatly interferes. The material of the two rings sliding upon each other must be such that a good sliding property will be assured. The different materials, however, have different heat coefficients. This means that with large rings heat expansions are involved which lead to continuous disorders in operation.

The above mentioned difficulties have been overcome according to the present invention by an arrangement according to which the gaps arranged on both sides of the rotary piston or rotary displacement member and located between the housing and the rotary displacement member are broadened by an annular passage in which a sealing ring elastically deformable in radial direction is freely movable, said sealing ring, in the range of those respective pressure chambers in which at the respective time a higher pressure prevails than in the other pressure chambers, being pressed simultaneously against two sealing surfaces of the housing and the rotating displacement member. Furthermore, according to the present invention, the annular passage is, within the range of the sealing elements, subdivided by sliding shoes which are firmly mounted on the housing and have a very narrow play with regard to the rotating displacement member and with regard to the sealing ring passing between said sliding shoes and said sealing surfaces.

As will be evident from the above, the sealing ring is deliberately made non-bending resistant in radial direction, and the deformation of the slide ring in view of the pressure acting thereupon is taken advantage of in an advantageous manner. The increase in diameter in view of heat expansion can no longer harmfully affect the seal.

Moreover, with this new sealing arrangement, the stationary housing and the rotary displacement member are permitted to move radially and/or axially relative to each other within the limits occurring in practice, without affecting the seal. In this connection, it is immaterial whether the said relative movement or displacement is caused by inner or outer forces or by heat expansion or by too large a play in the journalling of the rotor in the housing.

The effect of the new seal is produced by the deliberately fostered radial deformation of a structural element of the seal, namely of the so-called check slide ring. Within the range of the chambers of higher pressure, those parts of said check slide ring which are associated with these chambers are pressed against the gap to be sealed. Within the range of the chambers in which a lower pressure prevails, those parts of the check slide ring which are associated with the chambers of lower pressure relieve the gap due to their radial deformation.

Referring now to the drawings in detail, the arrangement shown therein comprises a rotary displacement member or piston 2 which is radially journalled in a bore 3 of a housing 1 and is axially journalled at the housing end faces 4 and 5 respectively.

Between housing 1 and rotary piston 2 there are on each side formed four pressure chambers separated from each other by sliding members 17, 18, 19 and 20 so that a total of eight pressure chambers are obtained. More specifically, on the left-hand side there are located the pressure chambers 6, 7, 8 and 9, whereas on the right-hand side there are located the pressure chambers 10, 11, 12 and 13. In the particular converter illustrated in the drawings, chambers 6, 7, 12 and 13 communicate through a hydraulic linkage with a reciprocable displacement member (not shown in the drawings). For purposes of simplicity, the pressure conduits leading to the pressure chambers have likewise been omitted.

Pressure chambers 8, 9, 10 and 11 communicate with a second (non-illustrated) displacement element through a second hydraulic linkage. The two non-illustrated reciprocable displacement members are respectively connected to two pistons of a two-stroke cycle diesel engine. The piston of one cylinder occupies its upper dead center point when the piston in the other cylinder is at its lower dead center point, and vice versa. Inasmuch as the hydrostatic converter during a rotation of its rotary displacement member or piston by 180° performs a complete cycle of the converter, the ignition sequence of the two cylinders is spaced by 90° with regard to the rotary angle of the rotary piston.

Figure 4:
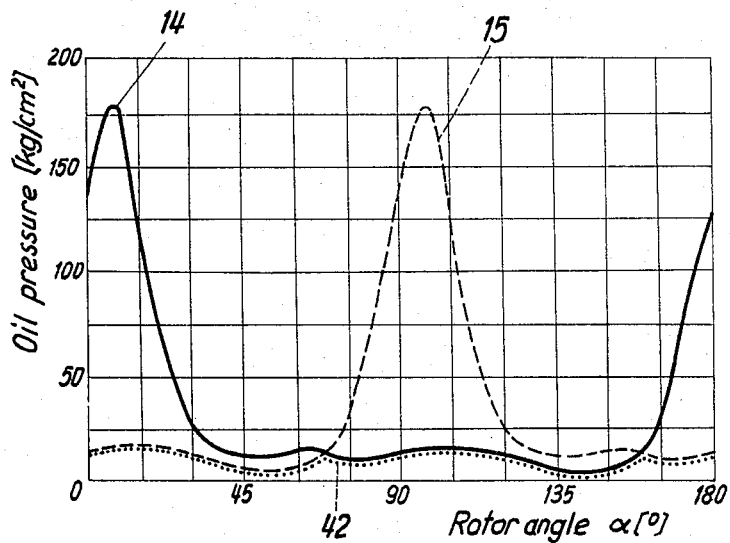
FIG. 4 represents a graph showing the pressure of the fluid in the two pressure chamber systems which are in operative connection with the two pistons of the internal combustion engine, said pressure being shown in conformity with the angle of rotation of the rotary piston or rotary displacement member.

FIG. 4 shows a graph 14 indicating the course of the pressure of the liquid pressure medium in pressure chambers 6, 7, 12 and 13 associated with one of said reciprocable displacement members, whereas curve 15 illustrates the course of the liquid pressure medium in pressure chambers 8, 9, 10 and 11 associated with the second reciprocable displacement member.

While the pressure in chambers 6, 7, 12 and 13 reaches its peak in the upper dead center point of one reciprocable displacement element in conformity with curve 14, the other reciprocable displacement element is in its lower dead center point, and the pressures in chambers 8, 9, 10 and 11 are at that time of a considerably smaller magnitude as indicated by curve 15.

Thus, at this time the pressure fluid will in conformity with the flow lines 16 in FIG. 2 below sliding members 17, 18, 19 and 20, which seal the individual pressure chambers relative to each other, flow along the annular surfaces 4 and 5 from the chambers of higher pressure to the chambers of lower pressure. Moreover, the pressure medium will along the flow lines illustrated in FIG. 1 designated with the reference numerals 21 to 24 flow from chambers of higher pressure into chambers of lower pressure. This play is in cycles changed in conformity with the pressure in the pressure chambers, for instance in conformity with FIG. 4.

Figure 5:
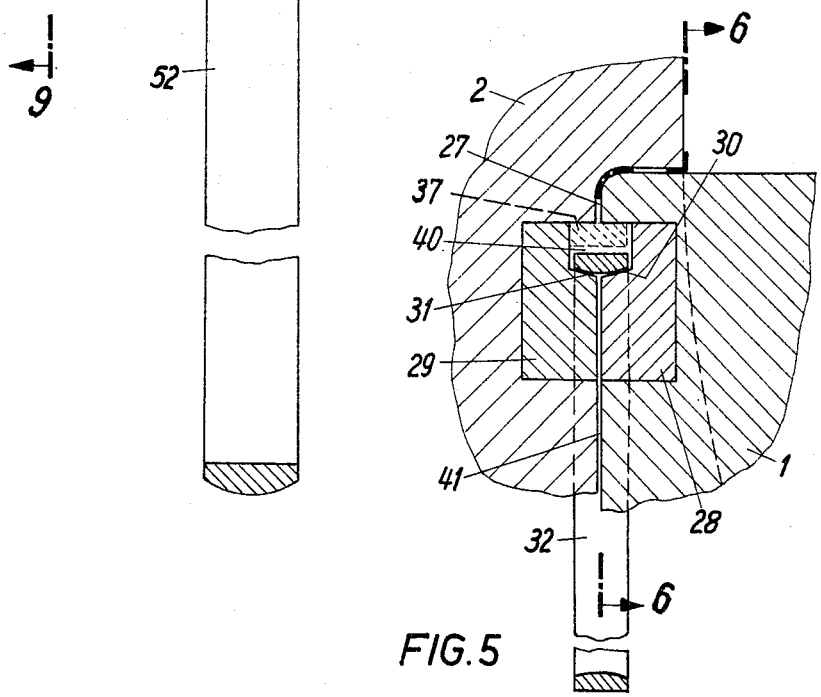
FIG. 5 illustrates on a considerably larger scale than FIG. 1 that portion of the latter which is encircled by the dot-dash lines x.

While the sealing problem underlying the present invention has been explained above in connection with FIGS. 1 to 4, reference may now be had to FIG. 5 illustrating a seal according to the present invention which is arranged at 25 and 26 (FIG. 1). FIG. 5 shows a portion of housing 1 and of rotary piston 2. Both elements 1 and 2 confine therebetween a gap 27 to be sealed. In conformity with the present invention, a machined ring 28 preferably of lead bronze is inserted into housing 1. A similar ring 29 is inserted into rotary piston 2. Each of said rings has a cone 30, 31 respectively of a suitable angle on which is movably mounted a polished ring 32 of high strength, preferably of steel. Ring 32 may have a cross section as shown in FIG. 5 but may also have any other desired cross section. Various cross-sectional shapes suitable for ring 32 are illustrated by way of example in FIG. 7.

*Operation*

The operation of the seal is as follows:

It may be assumed that rotary piston 2 rotates relative to stationary housing 1. Consequently, ring 29 connected to rotary piston 2 likewise rotates, whereas ring 28 connected to housing 1 is stationary. Steel ring 32 moves on said rings 28 and 29 which move relative to each other and may consist, for instance, of lead bronze. Ring 32 has a diameter which is somewhat greater than the diameter of cones 30 and 31 at the circumferential lines on which ring 32 slides. As an example, a play of from 1 to 2 millimeters will be suitable when the diameter of the rings is approximately 1 yard. Annular gap 27 is the gap to be sealed.

According to FIG. 6, ring 32, which may also be termed a check slide ring, is subjected to the higher pressure 74 in chambers 6 and 7 and to the lower pressure 75 in chambers 8 and 9. Consequently, ring 32 will, within the range of chambers 6 and 7, i.e. between sliding members 17, 18, and 19 and 20, be pressed against the two rings 28 and 29 in the manner of the ball of a check valve, said rings 28 and 29 being indicated by the dash line circle 33 in FIG. 6. Thus, the annular gap 27 between sliding members 17 and 18 and also between 19 and 20 will be closed, which means that the gap section at 34 will become zero. At the same time—and this is desirable—the check sliding ring 32 between sliding members 18 and 19 and 17 and 20 will be lifted off from rings 28 and 29 (illustrated in FIG. 6 by circle 33) by the distance 35 so that the annular gap 27 will be open between said sliding members. Any oil under pressure which might have passed between sliding members 17 and 18 and 19 and 20 because the seal is not 100% may now flow off into chambers of lower pressure 75 through gap 27 between sliding members 18 and 19 and 17 and 20. This process is desirable. It is advantageous that the oil which happened to pass through the seal be discharged into the chambers of lower pressure.

Immediately thereafter, in conformity with FIG. 4, the pressure in chambers 8 and 9 will be higher than the pressure in chambers 6 and 7. Check slide ring 32 will then between those sliding members between which it previously did not engage rings 28 and 29 effect an engagement and will be lifted off from rings 28 and 29 between those sliding members between which it previously engaged rings 28 and 29.

As will be evident from the above, the check sliding ring 32 thus acts in the manner of the ball of a check valve and seals the respective chambers of higher pressure with regard to the chambers of lower pressure along the gap 27 to be sealed. Ring 32 may rotate at the speed of rotary piston 2 and consequently together with ring 29. However, if desired, ring 32 may be connected to housing 1 and thus be stationary together with ring 28. Finally, ring 32 may rotate at any intermediate speed. Ring 32 is flexible in radial direction so that it can always within the range of the chambers of higher pressure sealingly engage rings 28 and 29.

It should also be noted that the enlarged annular gap 40 which is necessary for the freedom of movement of ring 32 in radial direction, is sub-divided by sliding shoes 36, 37, 38 and 39 within the range of the individual pressure chambers. In this connection, it is also desired that said sliding shoes seal relative to each other as well as possible. Sliding shoes 36, 37, 38 and 39 may also form a part of ring 28 which is stationary together with housing 1.

The above described check slide ring seal thus meets the requirements always to seal the chambers of higher pressure with regard to the chambers of lower pressure. While in annular gap 27 and the enlarged annular gap 40 between slide shoes 36, 37, 38 and 39 always viewing the circumference, the pressure prevails which prevails in the adjacent pressure chambers in conformity with curves 14 and 15 of FIG. 4, on the opposite side or inner side of ring 32 in gap 41 (FIG. 5), there will always prevail only that pressure which prevails at each time in the chamber system of lower pressure. FIG. 4 illustrates this lower pressure by the dot line curve 42. It is thus evident that all of the high pressure peaks which in the illustrated example rise up to 160 atmospheres are reduced to the smaller pressure of a maximum of 16 atmospheres.

These facts are taken advantage of in the further development of the present invention and, more specifically, in connection with the sealing of the pressure chambers of the above described hydrostatic converter not only with regard to the sealing of the pressure chambers to each other but also with regard to the atmosphere.

As described above, the check slide ring 32 reduces the chamber pressures of curves 14 and 15 of FIG. 4 to curve 42 of FIG. 4. This pressure which prevails in annular gap 40 has the further advantage that it is no longer different along the circumference of annular gap 41 but has at each time substantially the same magnitude. A heretofore known slide ring seal subjected to this pressure is not non-uniformly deformed by a non-uniform load on its rings but the rings are completely uniformly loaded over the entire circumference thereof by an intermediate pressure in conformity with curve 42. Moreover, the maximum pressure to be sealed by a non-slide ring seal is no longer as high as before. Thus, if a check slide ring seal according to the invention is followed by a heretofore known slide ring seal of any design, it is possible easily to seal the pressure chambers also toward the atmosphere. Such an arrangement will now be explained in connection with FIGS. 8 and 9 for section 43 of FIG. 1. A similar seal is, of course, to be provided at section 44.

FIG. 8 again shows on a larger scale a portion of housing 1 and rotor 2 of FIG. 1. Housing 1 has arranged thereon a ring 45, preferably of lead bronze, with a conical surface 46. Mounted on said rotor 2 is a ring 47 of steel which has connected thereto a lead bronze ring 48 with a conical surface 49. Ring 47 is held on rotor 2 by means of the two-sectional member 50 and the two-sectional wedge ring 51. According to this embodiment, check slide ring 52, since it has to seal toward the outside, has a diameter which is by 1 to 2 millimeters shorter than that of the conical annular surfaces 46 and 49 on which ring 52 slides. At the level of the sliding members, there are again connected slide shoes 53, 54, 55 and 56 which may also form a part of stationary ring 45 connected to housing 1. Lead bronze ring 45 has its outer circumference provided with a sliding surface 57 which simultaneously forms the sliding surface for the simple slide ring seal following the check slide ring seal. Ring 47 has an annular groove 58 for guiding slide ring 59. Slide ring 59 has an end sliding face 60 adapted to slide on sliding surface 57 of ring 45.

As has been set forth above, in annular passage 61 there will prevail the intermediate pressure in conformity with the dotted curve 42 of FIG. 4. This intermediate pressure is, through bore 62, conveyed to the back side of slide ring 59 whereby the slide ring 59 will be pressed against the sealing surface to the desired extent. In order to seal also at the time when the engine is started, ring 59 is, by means of helical springs 63, subjected to a slight pressure in contrast to the arrangement of FIGS. 5 and 6 according to which check slide ring 32 is subjected to pressure from the outside and therefore is pressed into a somewhat elliptical shape, check slide ring 52 is subjected to a higher pressure from the inside and thus will from the inside be pressed into an elliptical shape as illustrated in FIG. 9.

Figure 8:
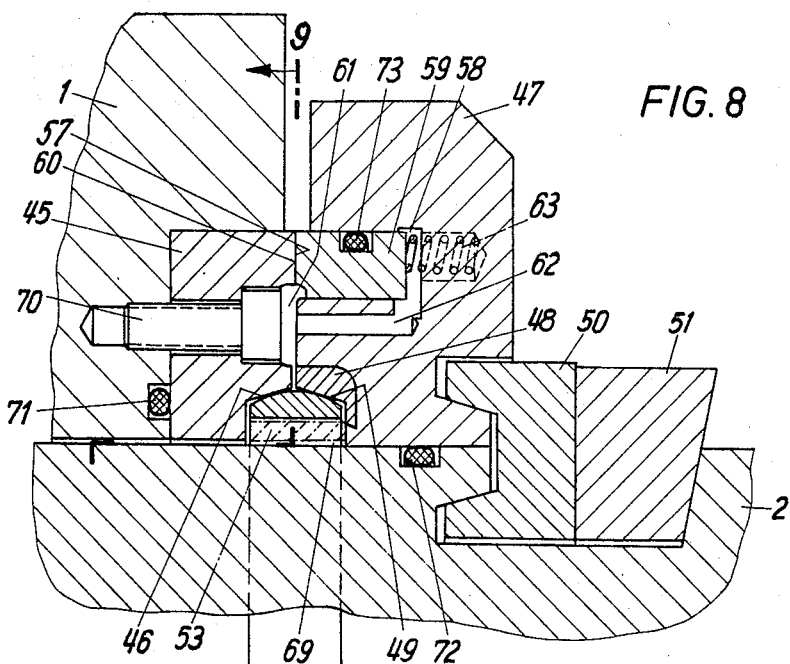
FIG. 8 illustrates on a larger scale than that of FIG. 1 that portion of the latter which is confined by the dot-dash line circle y.
Figure 9:
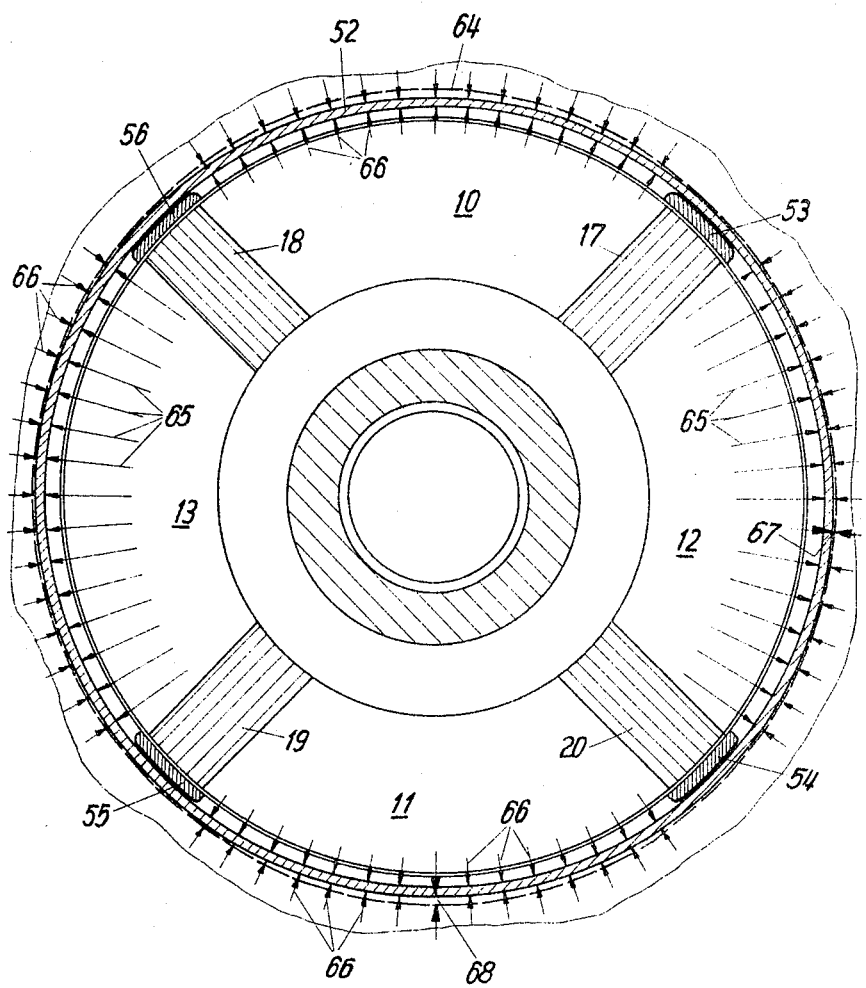
FIG. 9 is a section along the line IX—IX of FIG. 1 but on a larger scale than the latter.

According to FIG. 9, it is assumed that at the particular time under consideration a higher pressure 65 prevails in pressure chambers 12 and 13 as indicated by arrows. In chambers 10 and 11 there prevails a lower pressure 66 likewise indicated by arrows. In view of the higher pressure 65, slide ring 52 engages cones 46 and 49 shown in FIG. 8 and symbolically indicated in FIG. 9 by the dashed line circle 64. The distance 67 between ring 52 and cones 46 and 49 will within the range of pressure chambers 12 and 13 become zero.

The lower pressure 66 in chambers 10 and 11 is adapted to be conveyed through passage 61 (FIG. 8) to the entire circumference of ring 52. Therefore, within the range of chambers 10 and 11 there will prevail the same pressure 66 on both sides of ring 52 which will not be pressed against dash line circle 64 by a surplus force but will rather be removed therefrom in view of the assumed elastic shape of said circle and will be spaced therefrom by distance 68.

An annular gap broadening 69 is provided for the radial freedom of movement of slide ring 52 whose diameter of approximately 1 yard will, in this instance, be less by from 1 to 2 millimeters than the diameter of cones 46 and 49 in rings 45 and 48, measured where ring 52 approximately contacts said cones when said ring is pressured by an over-pressure against said cones. The said annual gap broadening 69 has at the level of the slide members to be filled in by sliding shoes 53, 54, 55 and 56 in order to prevent said broadened annual gap 69 from establishing a communication between the individual pressure chambers. However, on the other side, said sliding shoes 53, 54, 55 and 56 must permit sufficient freedom of movement for ring 52 so that the latter can easily pass therethrough.

Minor leakage losses cannot be avoided at these sections but can be kept rather small. Sliding shoes 53, 54, 55 and 56 may form a part of ring 45 which is stationary in the housing and which may be connected to the housing, for instance, by screws 70.

As outlined above, in annular passage 61 there will now prevail the low pressure indicated in FIG. 3 by curve 42 so that the slide ring seal formed by rings 45 and 59 will be able together with the surfaces 57 and 60 sliding upon each other to seal the remaining low pressure with regard to the atmosphere.

FIG. 8 additionally shows three O-rings 71, 72 and 73 which serve to completely seal at the respective sections.

It is, of course, to be understood that the present invention is, by no means, limited to the particular arrangements shown in the drawings but also comprises any modifications within the scope of the appended claims. In this connection, it is to be mentioned that the invention is also applicable to rotary piston displacement arrangements having radially displaceable sealing elements, in which instance the rotary displacement member or the housing chamber receiving the same will have a profile different from a circular shape which profile is symmetrical with regard to at least two planes passing through the axis.

An example of such a device is shown in FIGS. 10 and 11 of the drawings. 100 is a rotary piston with an elliptical cross section. It is adapted to slide on the hollow cylindrical inner surface of the rotary piston housing which is composed of two halves 101, 102 compressed to one another by screw-rods 103. The rotary piston 100 cooperates with four sealing elements 104 which are radially displaceably mounted in slides 105 in the housing 101, 102. The elements 104 are pressed against the rotary piston 100 by springs 106. In the crescent-shaped chambers 107, 108, 109, 110 between the rotary piston 100, the housing 101, 102 and the sealing elements 104 pressure will during rotation of piston 100 be built up periodically in alternating manner. The chambers 107, 108, 109, 110 are by means of channels 111 in the housing 101, 102 connected to a reciprocable displacement member (not shown in the drawings). The annular gaps 112 between the adjacent end faces of the rotary piston 100 and the housing 101, 102 are enlarged. In the enlarged gaps elastic sealing rings 113 are positioned the shape and operation of which principally are the same as that of the rings 32 described above. Sliding shoes 114 corresponding to sliding shoes 36, 37, 38, 39 are fixed to the housing 101, 102, respectively. Conical surfaces of the rings 113 cooperate with sealing cones 115 of the rotary piston 100 and 116 of housing 101, 102, respectively.

What I claim is:

1. A sealing arrangement, especially for a hydraulic movement converter, which includes: a housing, rotary displacement means rotatable in said housing and confining therewith chamber means and gap means adjacent said chamber means and in communication therewith, partition means supported by said housing for sliding movement being substantially uniformly distributed over the circumference of said rotary displacement means and subdividing said chamber means into a plurality of fluid chambers varying in volume with the rotation of said rotary displacement means, those adjacent end faces of said rotary displacement means and said housing which face each other within the range of said gap means being provided with oppositely located annular recess means so as to confine with each other annular groove means wider than said gap means, radially and elastically deformable sealing ring means freely rotatable in said groove means and adapted in response to a certain pressure in any of said chamber means to temporarily sealingily engage those surface areas of said groove means which are within the range of those chamber means in which said certain pressure prevails to thereby seal the respective adjacent gap section, and sliding shoe means connected to said housing and subdividing said annular groove means while closely and slidingly engaging said sealing ring means and said rotary displacement means.

2. An arrangement according to claim 1, in which the outer diameter of said annular recess means is less than the inner diameter of said chamber means.

3. An arrangement according to claim 1, in which said oppositely located annular recess means are provided in insert members respectively inserted in and connected to said housing and to said rotary displacement means.

4. In a hydrostatic movement converter: a stationary housing, rotary displacement means rotatable in said housing and together with opposite end faces of said housing confining a plurality of chamber means respectively arranged on opposite sides of said housing, partition means substantially uniformly spaced from each other and displaceable for sealing engagement with said rotary displacement means, said partition means subdividing the chamber means on each side of said housing into a plurality of chambers varying in volume with the rotation of said rotary displacement means, said rotary displacement means together with said end faces also confining radially inner and outer gap means communicating with the respective adjacent chamber means, each of said inner and outer gap means having an annular groove partly formed by said housing and partly formed by said rotary displacement means and considerably wider than said gap means, and annular radially and elastically deformable ring means respectively arranged in said grooves and operable in response to a certain pressure in any of said chambers to press the respective adjacent section of said ring means into sealing engagement with the respective adjacent groove section.

5. In combination in a sealing arrangement: a housing, a rotary displacement unit rotatable in said housing, partition means slidable in said housing together with said housing and said rotary displacement unit confining a plurality of chambers varying in volume during the rotation of said rotary displacement unit, said housing and said rotary displacement unit confining with each other radially inner and outer gap means in communication with said chambers, each of said inner and outer gap means including an annular wider section, first radially and elastically deformable annular ring means arranged in the annular wider section of said inner gap means, second radially and elastically deformable annular ring means arranged in the annular wider section of said outer gap means, each of said annular ring means being movable relative to the respective adjacent gap means and being adapted in response to a certain pressure in the respective adjacent chamber to seal the respective adjacent gap section, and sliding ring means arranged radially outwardly of said second annular ring means and respectively located in said housing and said rotary displacement unit and having end faces facing each other and in sealing sliding engagement with each other.

6. An arrangement according to claim 5, which includes annular passage means arranged between said radially outer gap means and said sliding ring means, and conduit means communicating with said annular passage means and leading to one of said sliding ring means for conveying pressure fluid to the latter to press the same against the adjacent sliding ring means.

7. An arrangement according to claim 5, which includes spring means continuously urging said sliding ring means into sealing sliding engagement with each other.

References Cited by the Examiner

UNITED STATES PATENTS

| 3,134,600 | 5/1964 | Fisch | 123—8 |
| 3,139,233 | 6/1964 | Simonsen | 123—8 |
| 3,176,910 | 4/1965 | Bentele | 123—8 |
| 3,195,421 | 7/1965 | Rumsey et al. | 123—8 |

MARK NEWMAN, *Primary Examiner.*

R. M. VARGO, *Assistant Examiner.*